(12) United States Patent
Rossignol et al.

(10) Patent No.: US 8,279,345 B2
(45) Date of Patent: Oct. 2, 2012

(54) SYSTEM AND METHOD FOR RANDOM NOISE ESTIMATION IN A SEQUENCE OF IMAGES

(75) Inventors: Francois Rossignol, Montreal (CA); Chon Tam Ledinh, Montreal (CA)

(73) Assignee: Qualcomm Incorporated, San Diego, CA (US)

( * ) Notice: Subject to any disclaimer, the term of this patent is extended or adjusted under 35 U.S.C. 154(b) by 382 days.

(21) Appl. No.: 12/643,851

(22) Filed: Dec. 21, 2009

(65) Prior Publication Data

US 2011/0019094 A1    Jan. 27, 2011

Related U.S. Application Data

(60) Provisional application No. 61/227,410, filed on Jul. 21, 2009.

(51) Int. Cl.
*H04N 5/00*    (2011.01)
(52) U.S. Cl. ......................................... 348/620; 348/618
(58) Field of Classification Search ........... 348/607–623
See application file for complete search history.

(56) References Cited

U.S. PATENT DOCUMENTS

| | | | |
|---|---|---|---|
| 5,025,312 A | 6/1991 | Faroudja | |
| 5,294,979 A | 3/1994 | Patel et al. | |
| 5,657,401 A | 8/1997 | De Haan et al. | |
| 5,836,872 A | 11/1998 | Kenet et al. | |
| 7,199,838 B2 * | 4/2007 | Lin et al. ...................... 348/607 |
| 7,317,842 B2 | 1/2008 | Lin et al. | |
| 7,418,149 B2 | 8/2008 | Dinh et al. | |
| 7,515,638 B2 | 4/2009 | Le Meur et al. | |
| 7,548,277 B2 | 6/2009 | Babonneau et al. | |
| 2004/0179602 A1 * | 9/2004 | Le Meur et al. ......... 375/240.12 |
| 2007/0139517 A1 | 6/2007 | Jenkins | |
| 2008/0002902 A1 | 1/2008 | Lin et al. | |
| 2008/0037897 A1 | 2/2008 | Chiang et al. | |
| 2009/0167951 A1 * | 7/2009 | Chiu ............................ 348/607 |

OTHER PUBLICATIONS

PCT International Search Report and the Written Opinion mailed Sep. 1, 2010, in related International Application No. PCT/US2010/042646.

* cited by examiner

*Primary Examiner* — Michael Lee
(74) *Attorney, Agent, or Firm* — Haynes and Boone, LLP

(57) ABSTRACT

A system and method for estimating random noise in an image frame or a sequence of image frames are presented. In some embodiments, the method includes performing Global Noise Estimation by comparing current and past filtered frames; converting global noise estimates into local noise estimates using estimated noise parameters based on current input image's local mean intensity; and providing local noise estimates to an adapted generic spatio-temporal filter. A parameter-based noise model is applied in the noise calculation.

14 Claims, 3 Drawing Sheets

SYSTEM AND METHOD FOR RANDOM NOISE ESTIMATION IN A SEQUENCE OF IMAGES

CROSS REFERENCE TO RELATED APPLICATIONS

This application claims priority to, and the benefit of U.S. Provisional Application No. 61/227,410, filed Jul. 21, 2009, which is incorporated herein by reference.

BACKGROUND

1. Technical Field

This invention relates to the field of image and video processing, and, more particularly, to methods and systems for noise estimation and noise reduction of image sequences for video reception.

2. Discussion of Related Art

Image and video noise reduction has matured over the last two decades and has gained high recognition from the general public. Before the 1990's, the most common types of noise seen in images and video were film grain noise, recording tape noise, and analog white noise caused by signal transmission and analog electronic components. Still to this day, some motion pictures still show film grain noise although the quality of these films has improved over the years. When the digital transmission era arrived in the 90's, it basically replaced some of these older types of noise with newer types of noise such as image and video compression artifacts. Digital cameras using CCD technology produce a less grainy image than films but still have an intrinsic Gaussian white noise produced by its photo-electronic components.

The older types of noise are generally referred to as random noise and may also be referred to as 3-D dynamic noise in the video field. They are not related to image and video compression artifacts. However, image compression and video compression are known to change characteristics of the random noise from the original image or video data. In fact, some codes are very efficient at reducing random noise levels. This implies that automatic noise reduction systems using the latest noise estimation techniques can work effectively on different types of media, which may have undergone different types of compression.

Many systems and methods have been developed to automate random noise reduction processes. Some systems and methods are robust and may support a wide range of noise levels without having to adjust any level parameter.

U.S. Pat. No. 5,025,312 refers to transmission path noise. Its method involves extracting low-level picture detail, reticulating a fractional component of those details and recombining both versions to obtain an approximate noise signal. This approximated noise signal can then be subtracted from the image signal in non-moving areas. Selective coring is applied on moving areas to reduce temporal filtering artifacts. The method is locally adaptive and the processing level depends on the frequency response of a band-pass filter used in the low-level detail extraction.

U.S. Pat. No. 5,294,979 describes a system for estimating noise in a small number of horizontal scanning lines of a video signal which includes a low-pass comb filter applied on the luminance component. The system performs a weighted summation of the corresponding pixels of adjoining horizontal scan lines within the same field and transmits a plurality of weighted summations to an accumulator. The resulting noise estimates are local on the vertical axis of the image. Proper thresholding is required for differentiating noise from low-level textures so that only the noise signal is sent to the accumulator.

U.S. Pat. No. 5,657,401 describes a method and apparatus for measuring noise in an image sequence. The method divides the image into a plurality of blocks and compares the current input frame to the past frame. The resulting sums of absolute differences (SAD) compose a histogram. A bin with SAD interval [A, B] that has a high-enough count and has the lowest upper interval boundary is chosen to deduct an image-based global noise estimate. Since the method is based on the distribution in the generated histogram, it is possible to support a high range of noise reduction levels. However, the method proposed may not adapt well to varying noise levels intra image.

U.S. Pat. No. 7,317,842 describes a similar approach to estimating a frame-based global noise level. The image is divided into overlapping or non-overlapping blocks. For each block, the mean and standard deviation are calculated. The minimum standard deviation and corresponding block mean are found to set an interval. The minimum standard deviation may be adjusted based on the corresponding mean due to potential saturation (in very dark or very bright areas where the noise may have been clipped). The means of all standard deviations corresponding to the predetermined intervals (perhaps in the previous frame) are applied as the estimated noise level.

U.S. Pat. No. 7,515,638 describes a process for estimating both local and global noise in a sequence of images. The process involves techniques for motion estimation and compensation. The process uses displaced frame differences (DFD) to generate global statistics (such as minimum and mean) in order to estimate a global noise level. One adaptive algorithm can determine a local block-based noise level based on local DFD's of the current and previous frames, the global mean DFD, and the global noise estimate. The resulting local noise variance is then sent to a motion-compensated noise reducer. Although the process is fully adaptive and robust, it requires the costly addition of a motion estimator and motion compensator in an otherwise simple process.

U.S. Pat. No. 7,548,277 describes a similar device and method, but is limited to only performing a global noise estimate. The method also includes motion estimation and compensation techniques. It works on a pixel-based displaced frame difference, although the motion estimation and compensation methods are still block-based. Each pixel of displaced-frame difference is thresholded, validated, accumulated and accounted for in calculating the resulting global noise standard deviation. Luminance-based local weighting is then applied to this global estimate. Unless the device includes a motion-compensated noise reducer, adding a motion estimator and motion compensator may be too costly for the purpose of global noise estimation However, none of these methods provide a sufficient locally-adapted global estimation of random noise levels, especially based on the image's local luminance intensity. Therefore, there is a need for an inexpensive and robust random noise estimation system for image and video.

SUMMARY

In accordance with some embodiments of the present invention, a noise reduction system for an image frame includes a module that collects an input frame and a past filtered frame and calculates the absolute difference of the input frame and the past filtered frame; a noise estimation module that calculates a global noise variance from each frame by comparing the input and the past filtered frames, calculates a local mean of the input frame, and converts the global noise variance into a local noise variance using a parameter-based model; an adapted spatio-temporal filter that filters the local noise variance along with the input and the past filtered frames, and outputs a current filtered frame; and a frame buffer storing the current filtered frame for use as the next past filtered frame.

In some embodiments the noise estimation model further includes a threshold holder that defines a noise threshold value based on a user processing level and generates an invalid pixel map for each frame; a binary filter that filters the invalid pixel map; a histogram generator that generates multiple bins based on the local means, wherein the absolute difference of the input frame and the past filtered frame is accumulated in each histogram bin according to its local mean; and a noise parameter calculator that does a curve-fitting based on the parameter-based noise model.

In some embodiments, the parameter-based model is a 3-parameter noise model, such as represented by $y=a\,x^b+c$, where y is the local noise variance, x is the local image intensity, a, b, c are the three parameters in the model, and the curve-fitting of the 3-parameter noise model includes solving the $y=a\,x^b+c$ noise distribution model.

Consistent with some embodiments of the present invention, a method of performing global random noise estimation in an image frame by a computer includes collecting a current image frame, collecting a past filtered image frame, calculating a global noise variance from each image frame by comparing the current and the past filtered frames; dividing the current image frame into local blocks; converting the global noise variance of the current image frame into local noise variances corresponding to the local blocks, using a parameter-based model; providing local noise variances to an adapted spatio-temporal filter; and applying the adapted spatio-temporal filter to the local noise variances along with the current and the past filtered frames; and outputting a filtered frame for the current frame.

These and other embodiments are further disclosed below with reference to the following drawings.

DETAILED DESCRIPTION

Figure 1:
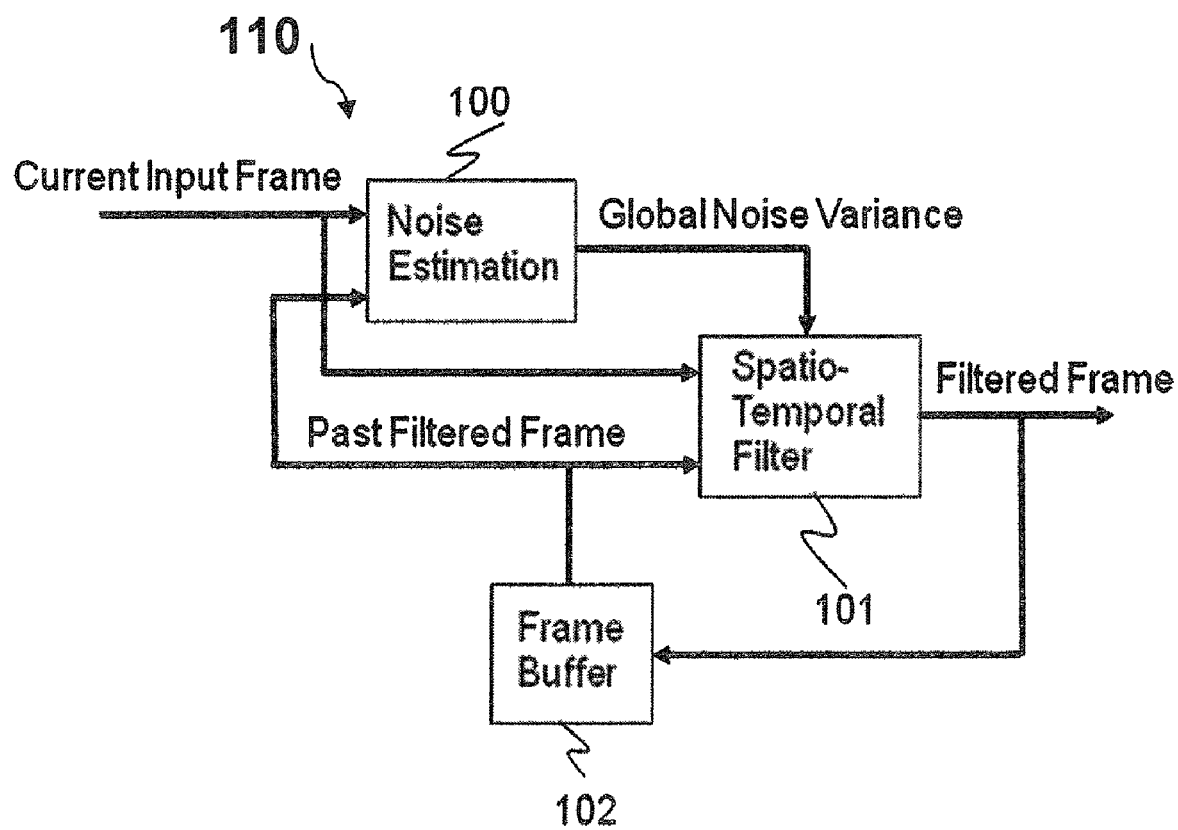
FIG. 1 illustrates a block diagram of an exemplary video noise reduction system.

Reference will now be made in detail to embodiments of the present invention, examples of which are illustrated in the accompanying drawings. Wherever possible, the same reference numbers will be used throughout the drawings to refer to the same or like parts.

Although conventional noise estimations may calculate local noise level estimates, they do not take the advantage of some important characteristics of random noise. Random noise can be characterized into two categories: signal-independent and signal-dependant. Levels of a signal-dependant noise depend on local image intensity (x). This may be luminance intensity in a YUV color format or R, G, and B intensities in an RGB color format. Other color formats exist and may also be used to model noise levels. Levels of a signal-independent or additive noise are usually constant, but may vary from frame to frame in a video sequence. Both types of random noise may be present in a sequence of images. In this case, a more robust noise model can be used to provide more accurate local noise estimates.

Some embodiments of the present invention include a novel non-iterative method for estimating random noise in an image or a sequence of images that may or may not have undergone digital compression. Such a method can provide a much more robust noise estimation model than those presented in more conventional models. According to some embodiments of the present inventions, estimated noise levels can be represented by a parameter model, for example, a three-parameter model, in which the noise level is expressed as a function of an image's local luminance intensity.

An exemplary model includes a function that contains three parameters a, b, and c, which can be properly estimated, utilizing the images luminance data. In some embodiments, these parameters can be derived by using standard arithmetic operations. The estimated noise parameters can be updated image-by-image and sent to a noise reducer for further processing. This noise reducer may be adapted, for example, to calculate local mean luminance intensity (pixel-by-pixel), to apply the local mean luminance intensity to the function with the provided parameters, and to use the resulting local noise variance to properly filter the image.

A noise level model can be a function between the local image intensity x and the noise level or variance y. For example, additive white noise would be represented by $y=c$, where 'y' is the estimated noise variance and 'c' is a constant. A signal-dependant noise model may resemble $y=ax^b$, where 'a' and 'b' are constant parameters and 'x' is the local image intensity. More generic noise level models could be represented by $y=ax^b+c$. Noise level models according to embodiments of the present invention can be represented by much more complicated functions as well. These models can then be solved by building a histogram and finding the least-mean-squared error (LMSE) between the model and the histogram levels. To do so, regression or "curve-fitting" algorithms can be used to solve simple linear models. For more complex, non-linear models, iterative fixed-point or convergence algorithms can be used. The latter may be time consuming and computationally expensive in some embedded systems.

FIG. 1 illustrates a block diagram of a video noise reduction system 110 according to some exemplary embodiments. Video noise reduction system 110 includes, for example, a noise estimation block 100, a spatio-temporal filter 101, and a frame buffer 102. Current input frame and past filtered frame enter the noise estimation block 100. Global noise variance estimates along with both current input frame and past filtered frame enter a spatio-temporal filter 101, which outputs the noise-reduced or filtered image. Filtered image enters frame buffer 102, which outputs the past filtered frame for input to noise estimation 100 and spatio-temporal filter 101.

The illustration in FIG. 1 constitutes an example of what is usually encountered in most generic spatio-temporal noise reduction systems. A frame buffer 102 is required to perform temporal noise reduction since a set of past or reference frames is required to filter the present frame. Most high-end noise reduction systems include a noise estimation algorithm, of varying complexity, although it may also be possible that only the viewer can manually adjust the noise estimates via a user-interface, such as an OSD or a software GUI or CLI.

Figure 2:
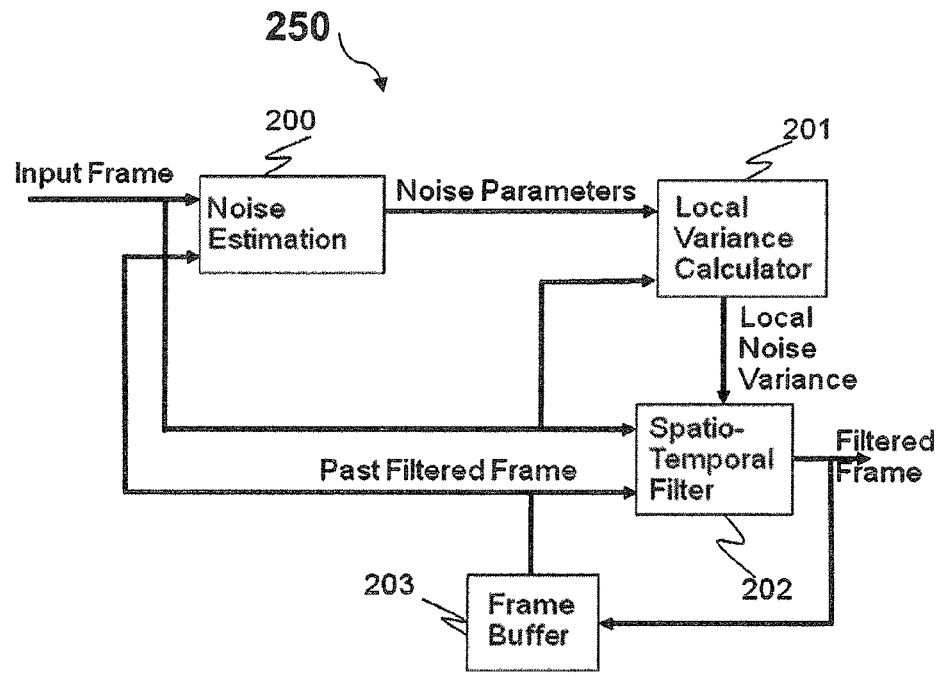
FIG. 2 illustrates a block diagram of an adapted video noise reduction system which uses novel noise estimation including a local variance calculator, consistent with some embodiments of the present invention.

FIG. 2 illustrates a block diagram of an adapted video noise reduction system 250 that uses a model-based noise estimation, which estimates parameters of a noise model, according to some embodiments of the present invention. The main difference between FIGS. 1 and 2 is that the later divides the noise-estimation portion of the system into a two-step process. The first process performs a noise-extraction from an entire image, gathers and classifies noise statistics, such as a distribution histogram, and performs fast curve-fitting to determine a set of global noise parameters (constants for the duration of a frame) representing a mathematical model. The second process converts these global noise parameters into local noise variance values, using local mean image luminance intensity. As discussed earlier in the prior arts, most systems either determine a global noise estimate as a constant value for additive signal-independent noise or perform local noise estimation based on local statistics (such as mean, variance and $3^{rd}$ moment) using a small context or footprint. The later has flaws since local statistics don't differentiate between noise and texture very well, unless a good motion compensation method is used. FIG. 2 differs from these two methods in the sense that global noise parameters are generated from plenty of data, some of which are signal-independent (constants), and some of which are signal-dependant (can be converted into local estimates). The fact that these local estimates are derived from a global estimate makes the noise reduction process more consistent and more robust in images containing textures which are similar to noise (grass, water waves, roof-tops, gravel roads, etc.).

Figure 3:
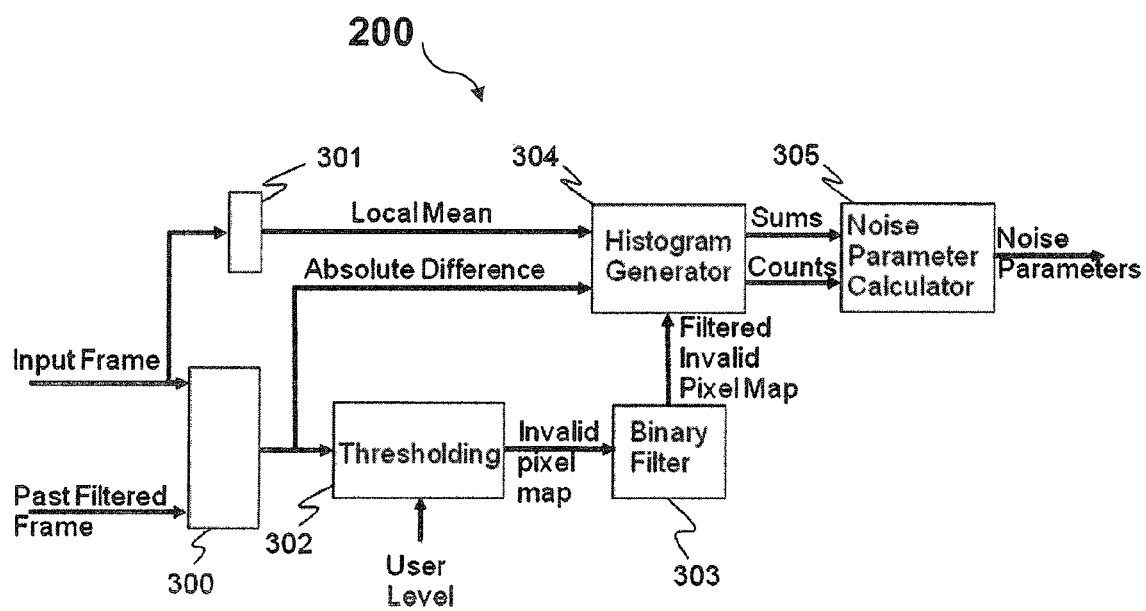
FIG. 3 illustrates a block diagram of a noise estimation system consistent with some embodiments of the present invention.

Current input frame and past filtered frame enter the model-based noise estimation block 200. Noise parameters along with input frame enter local variance calculator 201. Local noise variance along with both current input frame and past filtered frame enter a spatio-temporal filter 202, which then outputs the filtered image. Filtered image enters frame buffer 203, which outputs past filtered frame that is the input to noise estimation 200 and spatio-temporal filter 202. As shown in FIG. 3, noise estimation 200 can include an input module 300 to compare the input frame data and past filtered frame data, a thresholding block 302 that takes the user level defined threshold to create an invalid pixel map, a histogram generator 304 to place the image data into luminance mean based histograms and a noise parameter calculator 305 to output noise parameters.

Local Variance Calculator 201 in FIG. 2 uses the estimated noise parameters of the model's function and locally applies the input frame's local mean intensity to determine an equivalent adaptive local noise variance. The local noise variance can then be low-pass filtered by Local Variance Calculator 201 to soften abrupt discontinuations in local noise estimates. The local noise variance calculated by Local Variance Calculator 201 is then provided to the spatio-temporal filter 202.

Spatio-temporal filter 202 can be an effective noise reducer for image processing. A suitable example of a spatio-temporal filtering technique combines Minimization of Output Noise Variance (MNV), Embedded Motion Estimation (EME), classical motion estimation, and motion compensation for a more efficient noise reducer. In addition, some embodiments of spatio-temporal filtering further utilizes a spatial noise reducer, which combines Minimum Mean Squared Error (MMSE) with robust and effective shape adaptive windowing (SAW) for smoothing random noise in the whole image, particularly for edge regions.

FIG. 3 illustrates a block diagram of a model-based noise estimation 200 consistent with some embodiments of the present invention. The current input frame and past filtered frame enter an absolute difference calculator 300. Input frame also enters local mean calculator 301. Absolute difference pixels are evaluated in thresholding block 302, which provides an invalid pixel map based on a threshold. The threshold is determined by the user level, which is an input from a user processing level. The invalid pixel map is then sent to a binary filter 303. A binary filter is frequently used in image processing techniques by either transmitting or blocking spatial frequencies absolutely based on certain criteria. Binary filter 303 emphasizes the user defined processing level and it can be used to gain additional control of passing or blocking within the invalid pixel map. The filtered invalid pixel map, along with the local mean from local mean calculator 301 and the absolute difference pixels from absolute difference calculator 300, enter a Histogram Generator 304, which distributes and accumulates noise into bins according to its local means calculated by the local mean calculator 301. Sums and Counts from the Histogram Generator 304 are sent to a noise parameter calculator 305, which outputs the estimated noise parameters according to the noise model function.

In some embodiments, absolute difference (AD) calculator 300 calculates the following for each frame:

$$AD(\text{row},\text{col},n) = |\text{img\_}Y(\text{row},\text{col},n) - \text{img\_}Y\_\text{filt}(\text{row},\text{col},n-1)| \quad (1)$$

where img_Y is the luminance component of the current frame and img_Y_filt is the luminance component of the past filtered frame, row and col are pixel coordinates (row, column) in a frame, n corresponds to a current frame and n−1 corresponds to a past frame. The result is a pixel-based signal of absolute difference values, aligned with the current input frame. Local mean calculator 301 includes a small sampling window that calculates the mean of all included samples.

Thresholding block 302 sets a thresholding value based on the user's processing level. The threshold value determines if an absolute difference is small enough to be considered noise. A binary map of "bad" or invalid pixels is sent to binary filter 303, which then removes outliers and saves good pixels from being extracted as noise only because they may surround a dense invalid region.

In some embodiments, Histogram Generator 304 includes N accumulators and N counters, representing N histogram bins. Histogram Generator 304 classifies the valid pixel-based absolute differences according to their local means. The number of histogram bins (N) can be adjusted by quantizing the local mean signal with desirable units. This is achieved by dividing the local mean with a value Q and truncating it prior to classifying the absolute differences. A 'count' is the number of pixels sharing the same truncated local mean intensity in each histogram bin, and the total intensity of pixels falling in the same histogram bin forms the sum of that bin. The resulting histogram sums and counts are then sent to the Noise Parameter Calculator 305.

Consistent with some embodiments of the present invention, Noise Parameter Calculator 305 may be implemented as a dedicated hardware block or may be an executable function on an embedded system CPU. The dedicated hardware or the embedded system is responsible for selecting the approximate parameter values in a function or a model to resemble the observed distribution in the histogram.

In accordance with some embodiments of the invention, one exemplary model to represent some types of random noise can be chosen as $$y = ax^b + c; \quad (2)$$

where 'a', 'b' and 'c' are the function's parameters, 'x' is the local mean intensity and y is the local noise variance value.

The 'a' and 'b' parameters are real numbers and the 'c' parameter is a zero or positive real number. A local image intensity and a noise variance are always zero or positive. These values may be constrained to support a limited range of noise levels. Solving the model corresponds to finding a, b, and c values that approximate the histogram's distribution. Many noise distributions can be approximated with precision utilizing the 3 parameter model illustrated in Equation (2). The model in Equation (2) is non-linear (when b≠1) and may utilize iterative calculation methods to solve for all 3 parameters at once.

However, the 3-parameter model illustrated in Equation (2) can be transformed and solved with a few manipulations and a single linear regression or "curve-fitting" step.

Figure 4:
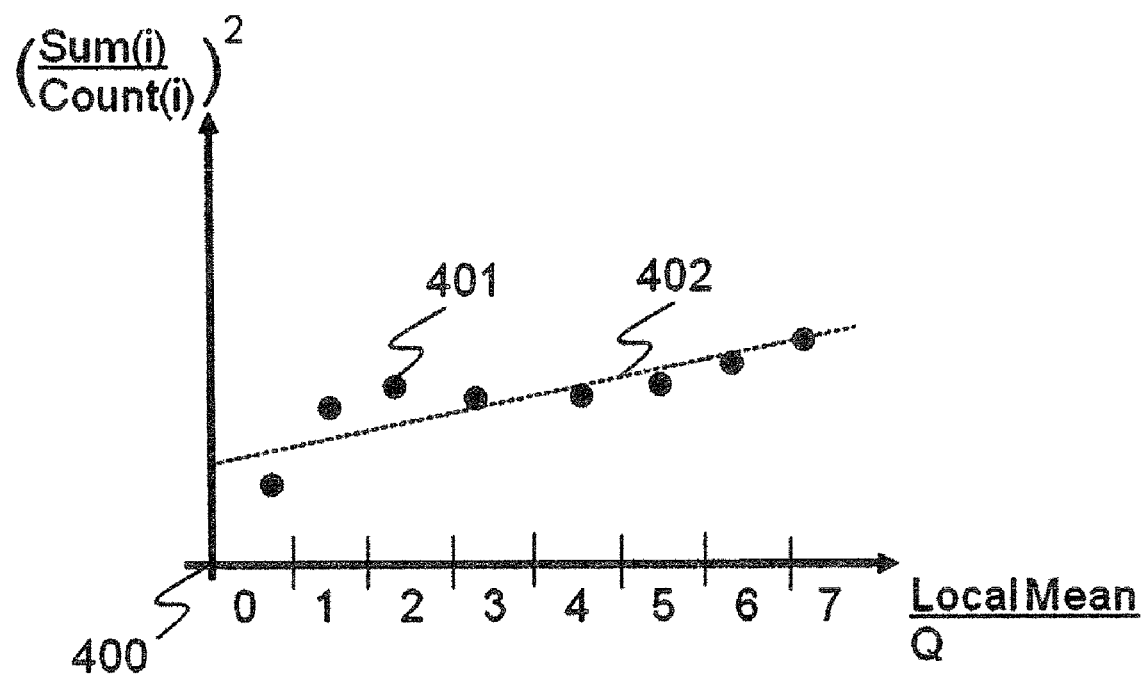
FIG. 4 shows a schematic of a noise extraction histogram, consistent with some embodiments of the present invention.

First the histogram sums and counts are processed to obtain measured noise variance for each local mean intensity bin. The sums are divided by the counts, squared and multiplied by a factor to approximate a variance value. In Equation (3) below, $y_i$ is the variance of bin 'i' and $x_i$ is the center local mean intensity in bin 'i'. As mentioned before, the histogram includes N bins, each of which has the local mean intensity quantized prior to the classification. FIG. 4 is a schematic example of a processed noise extraction histogram for Q=8.

$$y_i = a x_i^b + c \quad (3)$$

The first step to solve the equation applies a derivative with respect to $x_i$ to eliminate parameter c from the model:

$$y_i' = a b x_i^{(b-1)}; \quad (4)$$

where a and b are the remaining parameters to be resolved and $y_i'$ is now the slope of the noise distribution curve at $x_i$. Derivative $y_i'$ can be approximated by simply taking the difference between two neighboring points ($y_i - y_{i-1}$) and x; can be adjusted to represent the mean (($x_i + x_{i-1}$)/2) of these two points. Equation (4) can be rewritten as:

$$y_i' = a' x^{b'} \quad (5)$$

where a'=a b, and b'=b −1.

In the log domain, equation (5) becomes:

$$\log_2(y_i') = \log_2(a') + b' \log_2(x_i); \quad (6)$$

which can then be rewritten in the following form:

$$Y_i = A + B X_i. \quad (7)$$

where $A = \log_2(a') = \log_2(a\,b)$, and $B = b' = b-1$. A and B are both constants to be determined. Before the log function is applied as in equation (6), the derived data is analyzed, to make sure that y', a' and $x_i$ are greater than zero for the log function to be valid. However, $y_i'$ and a' can be zero or negative, in which case the following estimation and manipulation are applied.

It can be assumed that the noise model distribution either has a positive slope ($y_i'>0$), a null slope ($y_i'=0$) or a negative slope ($y_i'<0$). We can predict the slope's sign by calculating the weighted mean of all $y_i'$:

$$y_{wm}' = \sum_{i=0}^{N-1} y_i' n_i \Big/ \sum_{i=0}^{N-1} n_i \quad (8)$$

where $n_i$ is the count for bin i. If $y_{wm}'$ is positive, the operation logarithm can be applied and then linear regression is utilized to solve A and B. If the mean is negative, all $y_i'$ data points can be negated and function $$Y_i = -A - B X_i \quad (9)$$

is solved. If the mean is near zero, then there is no need to go any further, since A and B must be near zero and only 'c' in Equation (2) needs to be solved.

After applying the log operation in Equation (6) to all bins in the histogram to obtain $Y_i$ and $X_i$, A and B can be solved with the following linear regression equations:

$$B = \frac{\sum_{i=0}^{N-1} y_i x_i n_i - \left( \sum_{i=0}^{N-1} x_i n_i \sum_{i=0}^{N-1} y_i n_i \Big/ \sum_{i=0}^{N-1} n_i \right)}{\sum_{i=0}^{N-1} x_i x_i n_i - \left( \sum_{i=0}^{N-1} x_i n_i \sum_{i=0}^{N-1} x_i n_i \Big/ \sum_{i=0}^{N-1} n_i \right)} \quad (10)$$

$$A = \left( \sum_{i=0}^{N-1} y_i n_i - B \sum_{i=0}^{N-1} x_i n_i \right) \Big/ \sum_{i=0}^{N-1} n_i \quad (11)$$

The values for a' and b' can then be deduced:

$$b' = B \quad (12)$$

$$a' = 2^A; \text{ from } A = \log_2(a') \quad (13)$$

The original a and b are also deduced:

$$b = b' + 1 \quad (14)$$

$$a = a'/b \quad (15)$$

In equation (15), if b is near zero, both a and b can be set to 0, then noise is signal-independent, and equation (2) becomes y=c. The next step is to use the solved 'a' and 'b' parameters to solve for 'c'. This is done by computing another weighted mean:

$$c = \sum_{i=0}^{N-1} (y_i - a x_i^b) n_i \Big/ \sum_{i=0}^{N-1} n_i; \quad (16)$$

Figure 5:
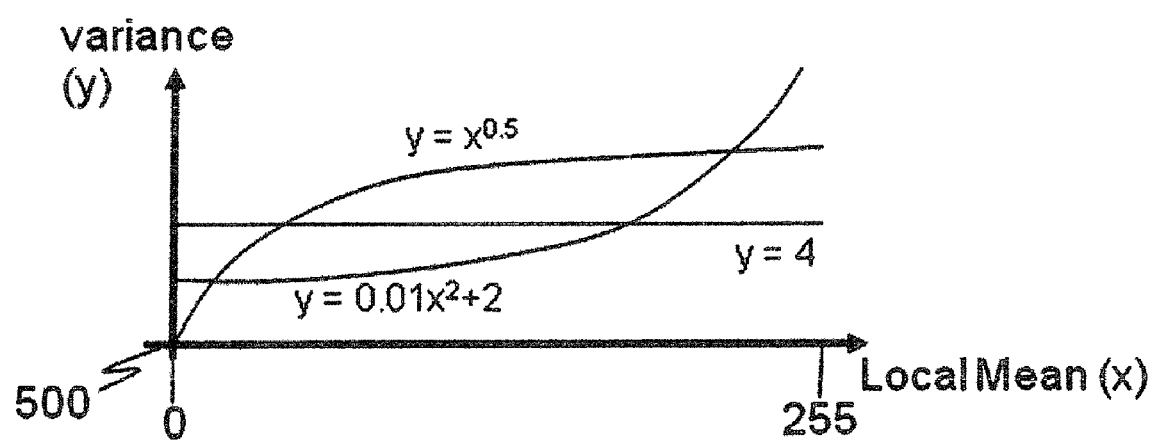
FIG. 5 shows noise variance versus local mean for various noise model functions, consistent with some embodiments of the present invention.

FIG. 5 illustrates examples of noise models with their respective 'a', 'b', and 'c' parameters chosen as shown.

In conclusion, for a given image, the noise estimator in a 3-parameter model will yield 3 parameters, a, b, and c. Although these estimates are frame-based global parameters, the equivalent additive local variance calculator 201 in FIG. 2 will evaluate the function to provide local noise estimates per pixel, categorized in groups separated by their local mean image intensity. For example, the estimated noise variance may be lower in darker regions of a scene than in brighter regions.

While the invention has been described in terms of particular embodiments and illustrative figures, those of ordinary skill in the art will recognize that the invention is not limited to the embodiments or figures described. It should be understood that the invention can be practiced with modification and alteration and that the invention be limited only by the claims and the equivalents thereof.

What is claimed is:

1. A noise reduction system for an image frame, comprising:
   a noise estimation module configured to generate noise parameters indicative of a global noise variance from each frame using a parameter-based model by comparing an input frame and a past filtered frame, and calculating a local mean of the input frame, the noise estimation module comprising:

an absolute difference calculating module that calculates an absolute difference of the input frame and the past filtered frame; and a histogram generator coupled to the absolute difference calculating module, the histogram generator receiving the calculated local mean and the absolute difference and classifying the absolute difference in a histogram bin according to its local mean;

a local variance calculator coupled to the noise estimation module, the local variance calculator configured to convert the global noise variance indicated by the generated noise parameters into a local noise variance;

an adapted spatio-temporal filter that filters the local noise variance along with the input and the past filtered frames and outputs a current filtered frame; and a frame buffer storing the current filtered frame for use as the next past filtered frame.

2. The noise reduction system of claim 1, wherein the noise estimation module further comprises:

a local means calculator that receives the input frame and calculates the local mean of the received input frame;

a threshold holder that defines a noise threshold value based on a user processing level and generates an invalid pixel map for each frame;

a binary filter that filters the invalid pixel map; and a noise parameter calculator module coupled to the histogram generator, the noise parameter calculator module configured to transform and solve the parameter-based noise model to generate the noise parameters.

3. The noise reduction system of claim 2, wherein the histogram generator is further configured to:

accumulate N sums of pixel-based absolute differences and accumulate N counts of corresponding valid pixels in an N-bin histogram; and quantize a local mean intensity of the N bins.

4. The noise reduction system of claim 3, wherein the parameter-based noise model is a 3-parameter noise model having the form $y = a x^b + c$, wherein y is the local noise variance, x is the local mean intensity, and a, b, c are the noise parameters.

5. The noise reduction system of claim 4, wherein transforming and solving the parameter-based noise model comprises:

processing the accumulated sums and counts to obtain measured noise variance for each quantized local mean intensity;

applying a derivative with respect to the local mean intensity on the model;

approximating the derivative;

applying a linear regression to the approximated derivative to determine the parameters a and b; and determining the parameter c from the determined parameters a and b.

6. A method of performing global random noise estimation in an image frame by a computer, comprising:

receiving an input image frame;

receiving a past filtered image frame;

calculating a local mean of the input image frame;

calculating an absolute difference of the input and the past filtered frames;

classifying the absolute difference in a histogram bin according to the local mean of the input image frame;

generating noise parameters indicative of a global noise variance from each frame using a parameter-based noise model;

calculating a local noise variance using the noise parameters indicative of a global noise variance filtering the local noise variances along with the current and the past filtered frames using an adapted spatio-temporal filter; and outputting a filtered frame and storing the filtered frame for use as a subsequent past filtered image frame.

7. The method of claim 6, wherein generating noise parameters indicative of a global noise variance further comprises:

determining a threshold value based on a user processing level;

applying the threshold value to the absolute differences of the input frame and the past filtered frame to generate a binary map of invalid pixels; and filtering the invalid pixel map using a binary filter.

8. The method of claim 7, wherein classifying the absolute difference in a histogram bin comprises:

accumulating N sums of pixel-based absolute differences;

accumulating N counts of corresponding valid pixels to generate a N-bin histogram; and quantizing a local mean intensity of the N bins.

9. The method of claim 8, wherein the parameter based noise model is a 3-parameter noise model having the form $y = a x^b + c$, wherein y is the local noise variance, x is the local mean intensity, and a, b, c are the noise parameters.

10. The method of claim 9, wherein generating noise parameters indicative of a global noise variance from each frame using a parameter-based noise model further comprises:

processing the accumulated sums and counts to obtain measured noise variance for each quantized local mean intensity;

applying a derivative with respect to the local mean intensity on the model;

approximating the derivative;

applying a linear regression to the approximated derivative to determine the parameters a and b; and determining the parameter c from the determined parameters a and b.

11. A model-based noise reduction system, comprising:

a noise estimation module configured to generate noise parameters indicative of a global noise variance from a received input frame and a received past filtered frame, the noise estimation module comprising:

a noise parameter calculator module configured to generate the noise parameters by solving and transforming a parameter-based noise model having the form $y = a x^b + c$, wherein y is a local noise variance, x is a local mean intensity, and a, b, c are the noise parameters;

a local variance calculator coupled to the noise estimation module, the local variance calculator configured to convert the global noise variance indicated by the generated noise parameters into a local noise variance;

an adapted spatio-temporal filter that filters the local noise variance along with the input and the past filtered frames and outputs a current filtered frame; and a frame buffer storing the current filtered frame for use as a next past filtered frame.

12. The noise reduction system of claim 11, wherein the noise estimation module further comprises:

an absolute difference calculating module that calculates an absolute difference of the input frame and the past filtered frame;

a local means calculator that receives the input frame and calculates a local mean of the received input frame;

a threshold holder that defines a noise threshold value based on a user processing level and generates an invalid pixel map for each frame;

a binary filter that filters the invalid pixel map; and a histogram generator coupled to the absolute difference calculating module, the histogram generator receiving the calculated local mean and the absolute difference and classifying the absolute difference in a histogram bin according to its local mean.

13. The noise reduction system of claim 12, wherein the histogram generator is further configured to:

accumulate N sums of pixel-based absolute differences and accumulate N counts of corresponding valid pixels in an N-bin histogram; and quantize a local mean intensity of the N bins.

14. The noise reduction system of claim 13, wherein transforming and solving the parameter-based noise model comprises:

processing the accumulated sums and counts to obtain a measured noise variance for each quantized local mean intensity;

applying a derivative with respect to the local mean intensity on the model;

approximating the derivative;

applying a linear regression to the approximated derivative to determine the parameters a and b; and determining the parameter c from the determined parameters a and b.

* * * * *